(12) United States Patent
Foster et al.

(10) Patent No.: US 9,420,744 B2
(45) Date of Patent: Aug. 23, 2016

(54) HYDRAULIC SYSTEM FOR COLLECTING CROP GRAIN AND CROP RESIDUE IN A SINGLE PASS

(71) Applicant: CNH Industrial America LLC, New Holland, WI (US)

(72) Inventors: Christopher A. Foster, Mohnton, PA (US); Bruce E. Anderson, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/591,333

(22) Filed: Jan. 7, 2015

(65) Prior Publication Data

US 2016/0192589 A1    Jul. 7, 2016

(51) Int. Cl.
| | | |
|---|---|---|
| A01D 39/00 | (2006.01) | |
| A01D 43/02 | (2006.01) | |
| A01D 75/00 | (2006.01) | |
| A01D 69/00 | (2006.01) | |
| A01D 41/02 | (2006.01) | |
| A01D 41/06 | (2006.01) | |
| A01D 41/12 | (2006.01) | |
| A01D 61/02 | (2006.01) | |
| A01F 7/00 | (2006.01) | |
| A01F 15/08 | (2006.01) | |
| A01F 15/10 | (2006.01) | |

(52) U.S. Cl.
CPC ............ *A01D 69/005* (2013.01); *A01D 41/02* (2013.01); *A01D 41/06* (2013.01); *A01D 41/12* (2013.01); *A01D 61/02* (2013.01); *A01F 7/00* (2013.01); *A01F 15/0841* (2013.01); *A01F 15/0875* (2013.01); *A01F 15/10* (2013.01)

(58) Field of Classification Search
CPC .. B30B 9/3057; B60K 25/00; A01D 43/006; A01D 46/084
USPC ........... 180/53.1; 100/269.01, 50, 3; 56/341, 56/10.7
See application file for complete search history.

(56) References Cited

U.S. PATENT DOCUMENTS

| | | | |
|---|---|---|---|
| 2,037,491 A | | 4/1936 | Wagoner |
| 3,897,841 A | | 8/1975 | Phillips et al. |
| 5,255,501 A | * | 10/1993 | McWilliams ........... A01F 15/07 100/88 |
| 5,661,961 A | * | 9/1997 | Westhoff ............... A01F 15/106 100/88 |

(Continued)

OTHER PUBLICATIONS http://www.gkmachine.com/products/ag-equipment/118.

*Primary Examiner* — Arpád Fábián-Kovács
(74) *Attorney, Agent, or Firm* — Rebecca L. Henkel

(57) ABSTRACT

A harvesting system for collecting crop grain crop residue in a single pass with a baler towed by a combine harvester is provided. The system includes a hydraulic system that hydraulically interconnects the combine harvester with the baler, allowing the engine of the combine harvester to hydraulically power systems and components of both the combine harvester and the baler. The hydraulic system may include a combine hydraulic system and a baler hydraulic system which may be hydraulically connected through multiple interconnections for hydraulically powering different functions of the baler using hydraulic pressure that is generated at the combine harvester. A first combine-to-baler hydraulic interconnection may transfer hydraulic power from a combine primary baler drive hydraulic circuit to a baler drive hydraulic circuit. A second combine-to-baler hydraulic interconnection may transfer hydraulic power from a combine spreader hydraulic circuit to a baler conveyor and/or auxiliary hydraulic.

16 Claims, 3 Drawing Sheets

(56) References Cited

U.S. PATENT DOCUMENTS

| | | | | |
|---|---|---|---|---|
| 5,664,923 | A * | 9/1997 | Olin | A01D 85/005 414/111 |
| 6,073,428 | A * | 6/2000 | Diekhans | A01D 41/1274 123/352 |
| 6,530,311 | B1 * | 3/2003 | Wilkens | A01F 15/0833 100/40 |
| 6,845,709 | B1 * | 1/2005 | Lackey | A01D 46/084 100/1 |
| 7,591,628 | B2 * | 9/2009 | Noonan | A01D 87/127 100/89 |
| 7,861,506 | B2 * | 1/2011 | Humbert | A01D 89/004 100/88 |
| 7,926,419 | B1 * | 4/2011 | Simon | B30B 9/3057 100/269.01 |
| 8,033,088 | B2 | 10/2011 | Shields | |
| 8,132,397 | B2 | 3/2012 | Shields | |
| 8,794,135 | B1 * | 8/2014 | Simon | B30B 9/3057 100/269.01 |
| 2008/0141639 | A1 * | 6/2008 | Shields | A01D 41/00 56/14.6 |
| 2008/0264031 | A1 * | 10/2008 | McHale | A01F 15/071 56/341 |
| 2010/0326037 | A1 | 12/2010 | Dillon | |
| 2010/0330337 | A1 * | 12/2010 | Dillon | A01D 41/10 428/156 |
| 2011/0023435 | A1 * | 2/2011 | Matousek | A01D 43/006 56/341 |
| 2011/0023437 | A1 * | 2/2011 | Kendrick | A01D 43/006 56/341 |
| 2011/0023438 | A1 * | 2/2011 | Matousek | A01D 43/06 56/341 |
| 2011/0023440 | A1 | 2/2011 | Matousek et al. | |
| 2011/0023441 | A1 | 2/2011 | Herron et al. | |
| 2011/0024538 | A1 * | 2/2011 | Matousek | A01F 15/10 241/191 |
| 2011/0029909 | A1 * | 2/2011 | Matousek | A01F 15/10 715/771 |
| 2012/0096827 | A1 | 4/2012 | Chaney et al. | |
| 2013/0291507 | A1 * | 11/2013 | Williams | A01D 46/08 56/13.5 |
| 2014/0162740 | A1 | 6/2014 | Foster et al. | |
| 2014/0373737 | A1 * | 12/2014 | Olander | A01F 15/0833 100/40 |

* cited by examiner

HYDRAULIC SYSTEM FOR COLLECTING CROP GRAIN AND CROP RESIDUE IN A SINGLE PASS

FIELD OF THE INVENTION

The present invention relates generally to harvesting and baling implements and, in particular, to a harvesting system for collecting crop grain and crop residue in a single pass with a baler towed by a combine harvester.

BACKGROUND OF THE INVENTION

Modern farming practices strive to minimize operating expenses. Reducing implement operating time in the field reduces fuel consumption and labor costs, which can help reduce overall operating expenses. Efforts have been made to try simultaneously performing different operations in the field to reduce equipment operating time in the field, including attempts at towing balers behind combine harvesters to simultaneously collect grain and bale residue. These efforts have included mounting auxiliary power sources to the balers, such as by installing engines on the balers themselves. This typically requires substantial modifications to the baler and the auxiliary engine consumes additional fuel and requires additional maintenance and service.

SUMMARY OF THE INVENTION

The present invention is directed to a harvesting system for collecting crop grain and crop residue in a single pass with a baler towed by a combine harvester. The harvesting system includes a hydraulic system that hydraulically interconnects the combine harvester with the baler, allowing the engine of the combine harvester to hydraulically power systems and components of both the combine harvester and the baler.

The hydraulic system may include a combine hydraulic system and a baler hydraulic system which may be hydraulically connected through multiple interconnections for hydraulically powering different functions of the baler using hydraulic pressure that is generated at the combine harvester. This may include a first combine-to-baler hydraulic interconnection for hydraulically powering primary functions of the baler and further combine-to-baler hydraulic interconnection for hydraulically powering secondary and tertiary functions of the baler. In this way, the first interconnection powers the baler flywheel, which is the primary power input to the baler. The second interconnection is two independently controlled hydraulic circuits, such as a conveyor drive and baler auxiliaries, with a common return. The return flow may be used to power a rotary screen cleaner for the cooling systems.

In accordance with one aspect of the invention, a harvesting system is provided for collecting a crop grain and a crop residue material in a single pass while harvesting a crop from an agricultural, field during a harvesting session. The harvesting system includes a combine harvester for harvesting the crop from the agricultural field and threshing the crop into separated constituents including the crop grain and the crop residue material. The crop grain is temporarily stored in the combine harvester during the harvesting session until the grain is unloaded during a grain unloading event. The crop residue material is discharged out of the combine harvester during the harvesting session. A baler having a baling chamber is towed behind the combine harvester for baling the residue material into bales. The baler has a conveyor extending between the combine harvester and the baler to move the crop residue material discharged out of the combine harvester to a crop feeding system delivering the crop residue material toward a packer or rotor that feeds a pre-chamber before the baling chamber of the baler. The harvesting system includes a hydraulic system having a combine hydraulic system providing hydraulic power to the combine and a baler hydraulic system providing hydraulic power to the baler. A first combine-to-baler hydraulic interconnection delivers hydraulic power from the combine hydraulic system to the baler hydraulic system for powering a first hydraulic circuit of the baler hydraulic system. A second combine-to-baler hydraulic interconnection delivers hydraulic power from the combine hydraulic system to the baler hydraulic system for powering a second hydraulic circuit of the baler hydraulic system. This may by done by way of a pair of hydraulic lines as feed and return lines between a combine primary baler drive pump and a flywheel drive motor, allowing it to run forwards and backwards, and a pair of feed lines from a spreader/conveyor hydraulic system to a conveyor drive motor and a baler auxiliary hydraulic circuit that share a common return line to tank. This may allow the hydraulic system to provide a combined or shared hydraulic system between the combine and baler hydraulic systems in a relatively straightforward and robust manner.

In accordance with another aspect of the invention, the combine hydraulic system includes a combine ground drive hydraulic circuit delivering power for moving the combine harvester and a spreader hydraulic circuit with spreader drive motors arranged in the combine harvester for rotating spreader disks to discharge the crop residue material out of the combine harvester. The first hydraulic circuit of the baler hydraulic system may be defined by a baler drive hydraulic circuit for delivering power to the baler to form the bales in the bale chamber of the baler. The second hydraulic circuit of the baler hydraulic system may be defined by at least one of a conveyor hydraulic circuit for powering the conveyor of the baler or a baler auxiliary hydraulic circuit. The baler auxiliary hydraulic circuit may power at least one hydraulic cylinder for actuating at least one of a bale ejector and a ramp actuator of the baler. The first combine-to-baler hydraulic interconnection may hydraulically connect the combine primary baler drive hydraulic circuit of the combine hydraulic system to the baler drive hydraulic circuit of the baler hydraulic system. This includes an additional hydraulic pump that is stacked on the back of the ground drive pump, as a baler flywheel drive pump for driving the baler flywheel. In this way, the ground drive and primary baler drive are independent hydraulic loops, with the two pumps bring mechanically driven together from the PTO gearbox. The second combine-to-baler hydraulic interconnection hydraulically may connect the spreader hydraulic circuit of the combine hydraulic system to the at least one of the conveyor and baler auxiliary hydraulic circuits of the baler hydraulic system. This may allow for a minimally invasive way of powering baler functions with hydraulic power generated at the combine harvester.

According to another aspect of the invention, the spreader hydraulic circuit may include a valve actuatable to selectively redirect hydraulic power away from the spreader drive motors and toward the conveyor hydraulic circuit. The valve may be arranged in a valve block at the combine harvester. An external pressure relief valve may be provided within the spreader hydraulic circuit, but remote from the valve block. This may allow for quickly changing operation of the combine harvester from a first mode, a spreading mode, for spreading the crop residue onto the field by activating the spreader drive motors to rotate the spreader disks to a second mode, a baling mode for deactivating the spreader disks and delivering the crop residue onto a conveyor that feeds the residue to the baler.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
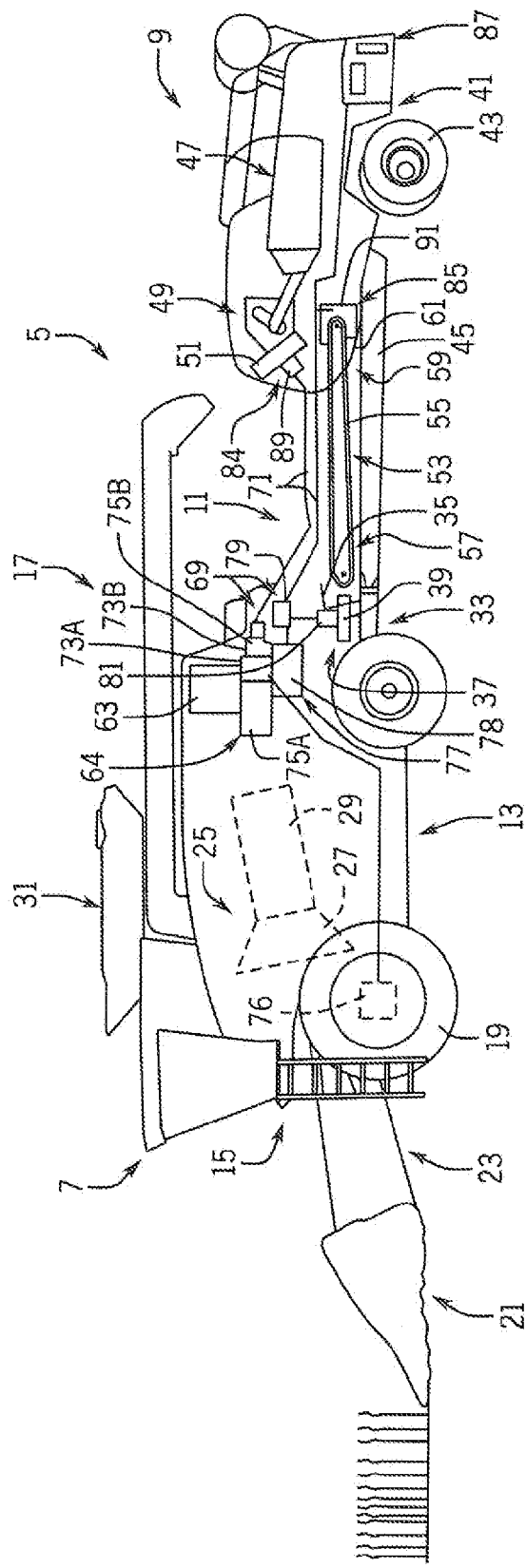
FIG. 1 is a simplified partially schematic side elevation of a harvesting system for collecting a crop grain and a crop residue material in a single pass in accordance with the present invention.

Referring now to the drawings and specifically to the simplified partially schematic representation of FIG. 1, a harvesting system for collecting crop grain and crop residue in a single pass while harvesting a crop from an agricultural field during a harvesting session is shown as system 5. System 5 includes a harvesting implement shown as a combine harvester 7 towing a baling implement shown as baler 9 and a hydraulic system 11 interconnecting the combine harvester 7 and baler 9 for transmitting hydraulic power from the combine harvester 7 to the baler 9 to power functions of the baler 9, for example, without auxiliary power supplies, as explained in greater detail elsewhere herein.

Still referring to FIG. 1, the combine harvester 7 may be one of the Axial-Flow® series harvesters available from Case IH or Twin Rotor® series harvesters available from New Holland. The combine harvester 7 has a chassis 13 with a frame and defining front and rear portions 15, 17 and wheels including ground drive wheels 19 that are hydraulically rotated to move the combine harvester 7 through the agricultural field during the harvesting session. A header 21 is supported at the front portion 15 of the chassis 13 for cutting the crop from the agricultural field and is configured to cut the particular crop being harvested from the field such as corn, wheat, soybean, barley, or other crops. A feeder section 23 connects the header 21 to the chassis 13, receives the cut crop from the header 21 and transports the cut crop from the header 1 to a threshing and cleaning system 25 in the combine harvester 7. The threshing and cleaning system 25 itself includes two primary systems, a threshing system and a cleaning system, used for separating clean grain from the crop residues. Threshed crop is dropped from the threshing system onto the cleaning system which includes a fan that blows air up through sieves that shake to clean the threshed crop. The threshing and cleaning system 25 includes a transition cone 27 receiving the cut crop material from the feeder section 23 and a rotor 29 that rotates to separate the cut crop into constituents such as crop grain and crop residue material which may include material other than grain such as straw, chaff, and/or other residue materials. The threshing and cleaning system 25 moves the crop grain to a grain tank 31 that stores the grain while harvesting until an unloading procedure. The threshing and cleaning system 25 moves the crop residue material to a spreader section 33 of the combine harvester 7 that defines an outlet opening 35 at the back portion 17 of the chassis 13 for discharging the crop residue material out of the combine harvester 7. Spreaders 37 (only one shown) are arranged in the spreader section 33, transversely on both sides of the opening 35, and configured to deliver the crop residue material out of the opening 35 by rotating spreader disks 39 to relatively widely broadcast or relatively narrowly windrow the crop residue material on the agricultural field when the combine harvester 7 is not towing the baler 9. However, when the combine harvester 7 is towing the baler 9 for simultaneously collecting crop grain and baling crop residue, the spreader disks 39 are deactivated, which may allow the crop residue material to be moved directly to the baler 9 without first falling onto the field, as explained in greater detail elsewhere herein.

Still referring to FIG. 1, baler 9 may be one of the LB™ series balers available from Case IH or the BB/BigBaler™ series from New Holland. Although the baler 9 is shown as a large square baler, it is understood that the baler 9 may instead be a small square baler or a round baler. The baler 9 has a chassis 41 with a frame that supports wheels 43 and a hitch frame 45 that is hitched to the combine harvester 7. A bale chamber 47 is arranged in the baler 9 for forming of bales from material that is fed into the baler 9. A baling drive system 49 is configured for delivering power to the baler 9 to form the bales in the bale chamber 47. The baling drive system 49 includes a flywheel 51 that is rotated to store and smoothly deliver energy for forming the bales in the bale chamber 47, for example, by transferring power to reciprocating and other components configured to form flakes from the material being baled in a compression chamber and combine the flakes in the bale chamber to form the bales themselves. The material formed into the bales is the crop residue material discharged from the combine harvester 7 that is moved from the opening 35 at the back portion 17 of the combine 7 to the baler 9 by a conveyor 53 extending between the combine harvester 7 and the baler 9. The conveyor 53 has a belt 55 that is rotated to move the crop residue material from a forward end 57 of the conveyor 53 positioned below or otherwise near the spreader section 33 of the combine harvester 7 to a rearward end 59 of the conveyor 53 positioned below or otherwise near an intake 61 of the baler 9 for receiving the crop residue material for processing into bales in the bale chamber 47.

Figure 2:
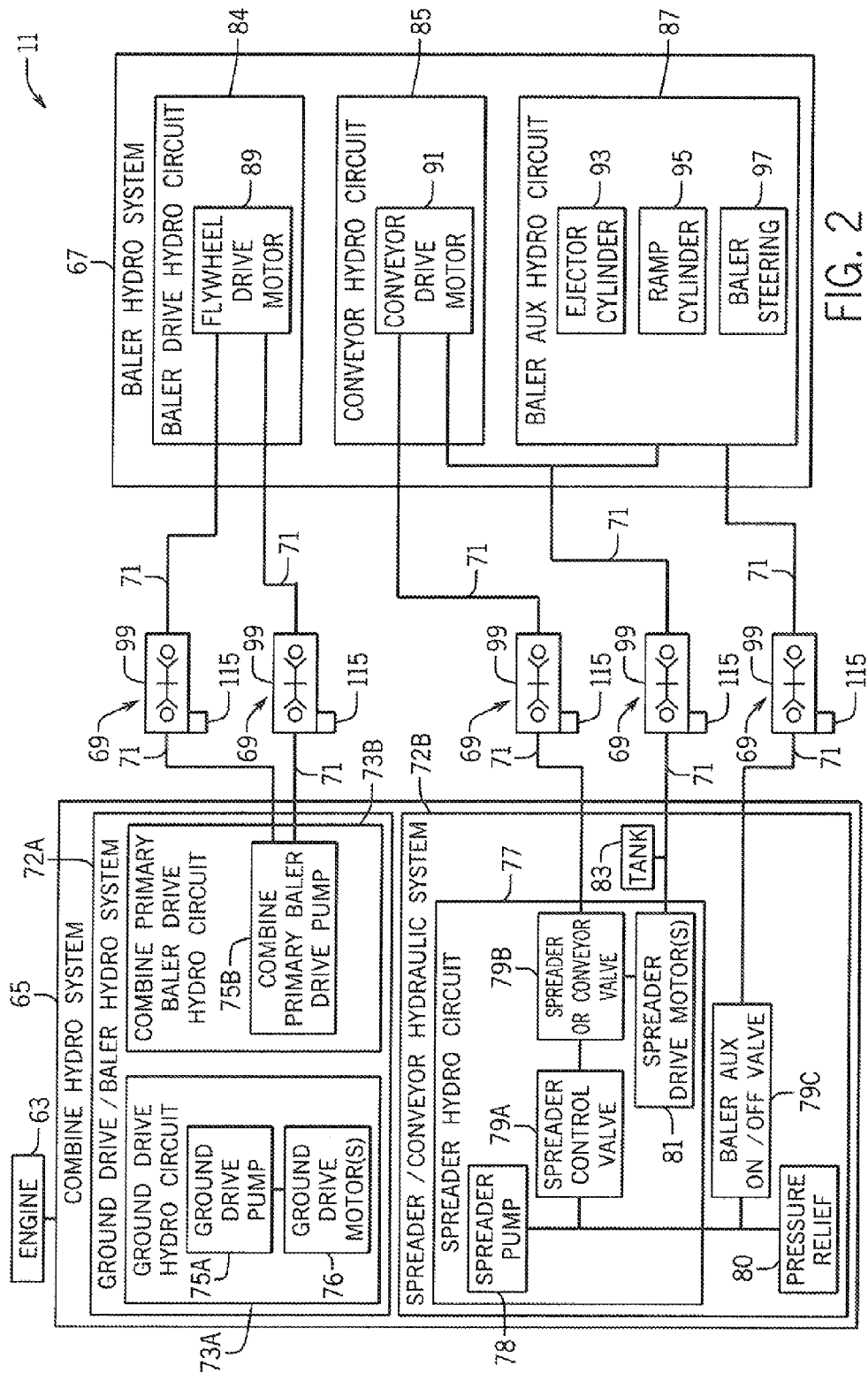
FIG. 2 illustrates a simplified schematic representation of a hydraulic system of the harvesting system of FIG. 1.

Referring to FIGS. 1 and 2, the functions of the various systems and components of the combine harvester 7 and baler 9 are powered through the hydraulic system 11 that includes an internal combustion engine 63 as a prime mover power source for pressurizing hydraulic fluid of the hydraulic system 11 to hydraulically drive various systems and components. The hydraulic system 11 includes a combine hydraulic system 65 receiving power from the engine 63, such as through an intermediate PTO (power takeoff gearbox 64, and a baler hydraulic system 67 connected to the combine hydraulic system 65 through at least one combine-to-baler hydraulic interconnection, shown as interconnection 69 that includes a hydraulic hose (s) or hydraulic line(s)

71. As described in greater detail elsewhere herein. FIG. 2 shows five hydraulic interconnections 69, with two for the baler flywheel drive, one for the baler conveyor drive, one for the baler auxiliary systems, and one for a common return to tank from the baler conveyor and baler auxiliary systems. To simplify explanation, a single hydraulic line 71 is shown in FIG. 1 connecting respective systems or components, although it is understood that, typically, at least a pair of hydraulic lines 71 will be provided to direct fluid to a system or component driven by the fluid and a return line directing fluid back toward a pump, fluid source, or collecting reservoir of sump. It is further understood that the hydraulic system 11 includes various fitting, connectors, passageways, valve arrangements, sensors, and other components allowing control of the components within the hydraulic system 11.

Referring now to FIGS. 1 and 2, the combine hydraulic system 65 includes ground drive/baler hydraulic system 72A (FIG. 2) that includes a combine ground drive hydraulic circuit 73A and a combine primary baler drive hydraulic circuit 73B. The combine ground drive hydraulic circuit 73A has a propulsion pump or combine ground drive pump 75A receiving power from the engine 63 through the PTO gearbox 64 (FIG. 1) to pressurize hydraulic fluid for delivery to a hydrostatic transmission that may be incorporated as a hydrostatic transaxle operably connected and delivering hydraulic power to hydraulic motors shown as ground drive motors 76 that rotate the ground drive wheels 19. The combine primary baler drive hydraulic circuit 73B defines an independent hydraulic loop with respect to the combine ground drive hydraulic circuit 73A. The combine primary baler drive hydraulic circuit 73B includes a combine primary baler drive pump 75B that is mounted to or otherwise stacked to the back of the combine ground drive pump 75A. The combine ground drive and primary baler drive pumps 75A, 75B are hydraulically independent of each other, although the two pumps are mechanically driven together from the PTO gearbox 64 (FIG. 1). Spreader/conveyor hydraulic system 72B (FIG. 2) includes a spreader hydraulic circuit 77 includes a spreader pump 78 that may be a stand-alone pump or other pump within the combine hydraulic system 65, such as within the combine ground drive hydraulic circuit 73A. Regardless, spreader pump 78 receives power from the engine 63 to pressurize hydraulic fluid for delivery through a valve block(s) 79 that controls and directs hydraulic fluid to components within the spreader hydraulic circuit 77, which may include or be operably connected to a spreader control valve 79A (FIG. 2) and spreader or conveyer valve 79B for respectively controlling the spreader(s) 37 (FIG. 1) or switching between powering or activating and deactivating the spreader(s) 37 and conveyor 53 (FIG. 1). The spreader hydraulic circuit 77 includes an external pressure relief valve 80 (FIG. 2) mounted remotely from the valve block 79. The spreader pump 78 through the valve block 79 and/or spreader control valve 79A and spreader or conveyer valve 79B directs hydraulic fluid to spreader drive motors 81 that rotate the spreader disks 39. Referring now to FIG. 2, spreader hydraulic circuit 77 by actuating the spreader control valve 79A and spreader or conveyer valve 79B to different positions, flow of hydraulic fluid is controlled to permit flow to the spreader drive motors 81, which returns to tank 83, when the combine harvester 7 is being used without the baler 9 or prevent flow of hydraulic fluid to the spreader drive motors 81 for diverting flow of hydraulic fluid around or bypassing the spreader drive motors 81 when the combine harvester 7 is being used with the baler 9.

Referring again to FIGS. 1 and 2, the baler hydraulic system 67 includes a baler drive hydraulic circuit 84, a conveyor hydraulic circuit 85, and a baler auxiliary hydraulic circuit 87. The baler drive hydraulic circuit 84 includes a hydraulic motor for delivering power to the baling drive system 49, shown as flywheel drive motor 89 arranged in driving communication with the flywheel 51. Although the flywheel drive motor 89 is shown as directly driving the flywheel 51, it is understood that the flywheel drive motor 89 may be spaced from the flywheel 51 and connected to the flywheel 51 by way of a PTO or other shaft. The conveyor hydraulic circuit 85 provides power for rotating the belt 55 of the conveyor 53. A conveyor drive motor 91 of the conveyor hydraulic circuit 85 engages and drives the belt 55 of the conveyor 53, directly or by way of cooperating pulleys and/or other transmission components. The baler auxiliary hydraulic circuit 87 provides power for performing auxiliary functions of the baler 9, other than the power of the baling drive system 49 or conveyor 53, including operations of various motors and/or cylinders of bale ejectors, folding bale chute or ramps, and locking or otherwise operating baler steering axles. These are shown as bale ejector cylinder 93, ramp actuator cylinder 95, and baler steering cylinder 97 (FIG. 3) that are operably connected to their corresponding components.

Referring now to FIG. 2, a coupler 99 is arranged within each of the five combine-to-baler hydraulic interconnections 69. The coupler 99 is shown as a double check valve so that disconnecting the coupler 99 retains all hydraulic fluid within the segments on opposite sides of the disconnected coupler 99. Couplers 99 may be quick couplings such as combine harvester-mounted female hydraulic remotes and cooperating male hydraulic fitting at ends of the hydraulic lines 71. First and second combine-to-baler hydraulic interconnections 69 between the primary baler drive hydraulic circuit 73B of the combine hydraulic, system 65 and the baler drive hydraulic circuit 84 of the baler hydraulic system 67 are made by feed line and return lines formed of respective segments of hydraulic lines 71 and couplers 99 hydraulically connecting the combine primary baler drive pump 75B with flywheel drive motor 89, allowing the baler flywheel drive motor 89 to run forward and backward in a bi-directional manner. Third, fourth, and fifth combine-to-baler hydraulic interconnections 69 are defined between the spreader hydraulic circuit 77 of the combine hydraulic system 65 and the conveyor and baler auxiliary hydraulic circuits 85, 87 of the baler hydraulic system 67. These include separate feed lines formed of respective segments of hydraulic lines 71 and couplers 99 hydraulically connecting spreader pump 78 to the conveyor drive motor 91 and baler auxiliary hydraulic circuit 87 as respectively permitted by the spreader or conveyor valve 79B and a baler auxiliary on/off valve 79C within the spreader/conveyor hydraulic system 72B. A common return line is formed of respective segment of hydraulic lines 71 and a coupler 99 receiving hydraulic, fluid from both the conveyor drive motor 91 and baler auxiliary hydraulic circuit 87 and return the flow to tank 83 and which may be used to power a rotary screen cleaner for the cooling systems. In this way, FIG. 2 shown five combine-to-baler hydraulic interconnections 69 with three feed lines and two return lines.

Figure 3:
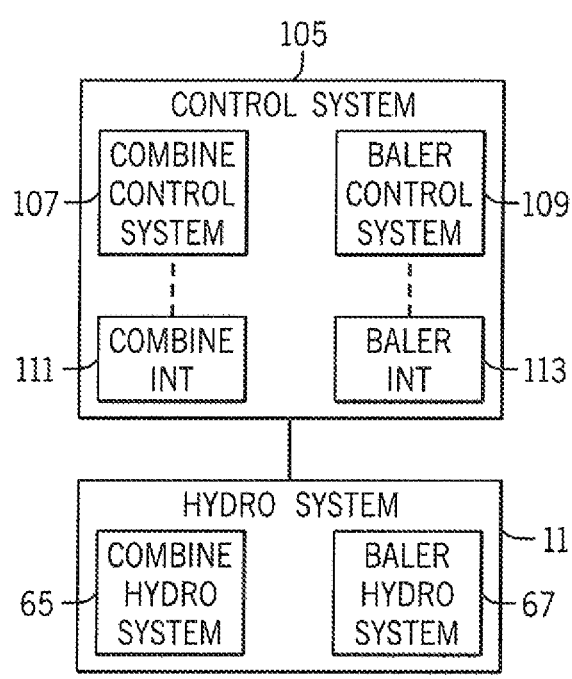
FIG. 3 illustrates a simplified schematic representation of a control system of the harvesting system of FIG. 1.

Referring now to FIG. 3, a control system 105 monitors and controls operation of the hydraulic system 11 and other systems and components of the system 5. Control system 105 includes a combine control system 107 and a baler control system 109 that operably communicate with each other, for example, by way of an ISOBUS connection, for coordinating controls of the combine harvester 7 and baler 9, including detecting when a baler 9 is connected to the combine harvester 7 for automatically deactivating the spreaders 37. Each of the combine and baler control systems 107, 109 includes a power supply and controller that may have an industrial computer or, e.g., a programmable logic controller (PLC), along with corresponding software and suitable memory for storing such software and hardware, including interconnecting conductors for power and signal transmission for controlling electronic, electro-mechanical, and hydraulic components of the combine harvester 7 and/or baler 9. A combine interface system 111 is operably connected to the controller of the combine control system 107 and includes a monitor and various input devices to allow an operator to see the statuses and control various operations of the combine harvester 7, for example, from within a cab of the combine harvester 7. A baler interface system 113 is operably connected to the controller of the baler control system 109 and includes a monitor and various input devices to allow an operator to see the statuses and control various operations of the baler 9, for example, from within a cab of the combine harvester 7. The combine and baler interface systems 111, 113 may include an AFS® Pro 700 Monitor display available for use with Axial-Flow® series harvesters and LB™ series balers available from Case IH.

Referring again to FIG. 2, sensors 115 are provided within the hydraulic system 11 for detecting when the baler 9 is connected to the combine harvester 7. This may be done by arranging the sensors 115 within the interconnections 69, such as at the couplers 99 for detecting when the hydraulic line 71 connect through the couplers 99 to hydraulic the couple the combine hydraulic system 65 to the baler hydraulic system 67. Referring again to FIG. 3, when the control system 105 receives a signal from the sensor(s) 115 indicating that the baler 9 is connected to the combine harvester 7, and a control system 105 commands the valve 83 to actuate to deactivate the spreaders 37 by bypassing the spreader drive motors 81 and instead direct hydraulic fluid through the coupler 99 to the conveyor and baler auxiliary hydraulic circuits 85, 87.

Many changes and modifications could be made to the invention without departing from the spirit thereof. The scope of these changes will become apparent from the appended claims.

We claim:

1. A harvesting system for collecting a crop grain and a crop residue material in a single pass while harvesting a crop from an agricultural field during a harvesting session, the harvesting system comprising:
    a combine harvester for harvesting the crop from the agricultural field and threshing the crop into separated constituents including the crop grain and the crop residue material, wherein the crop grain is temporarily stored in the combine harvester during the harvesting session until a grain unloading event and the crop residue material is discharged out of the combine harvester during the harvesting session;
    a baler having a baling chamber and towed behind the combine harvester for baling the residue material in the baling chamber and including a conveyor extending between the combine harvester and the baler to move the crop residue material discharged out of the combine harvester to the baling chamber for forming of the bales therein; and
    a hydraulic system including:
        a combine ground drive hydraulic circuit delivering power for moving the combine harvester;
        a spreader hydraulic circuit with spreader drive motors arranged in the combine harvester for rotating spreader disks to discharge the crop residue material out of the combine harvester;
        a conveyor hydraulic circuit receiving hydraulic power from the spreader hydraulic circuit and arranged to drive the conveyor of the baler, the conveyor hydraulic circuit includes a conveyor drive motor receiving hydraulic power from the spreader hydraulic circuit and configured to power rotation of a belt of the conveyor;
        a combine primary baler drive hydraulic circuit separate from the combine ground drive hydraulic circuit; and
        a baler drive hydraulic circuit receiving hydraulic power from the combine primary baler drive hydraulic circuit and delivering power to the baler for powering the forming of the bales in the bale chamber of the baler.

2. The harvesting system of claim 1 wherein the spreader hydraulic circuit includes a valve actuatable to selectively redirect hydraulic power away from the spreader drive motors and toward the conveyor hydraulic circuit.

3. The harvesting system of claim 2 wherein the hydraulic system includes a baler auxiliary hydraulic circuit and wherein actuating the valve of the spreader hydraulic circuit selectively redirects hydraulic power away from the spreader drive motors and toward the conveyor hydraulic circuit and the baler auxiliary hydraulic circuit.

4. The harvesting system of claim 3 wherein the baler auxiliary hydraulic circuit includes at least one hydraulic cylinder for actuating at least one of a bale ejector and a ramp actuator of the baler.

5. The harvesting system of claim 1 wherein the baler includes a baling drive system transmitting power from the baler drive hydraulic circuit to the bale chamber for forming the bale in the bale chamber.

6. The harvesting system of claim 5 wherein the baler is a square baler configured for making square bales from the crop residue material and wherein the baling drive system includes a flywheel rotated by power from the baler drive hydraulic circuit.

7. The harvesting system of claim 6 wherein the baler drive hydraulic circuit includes a baler drive motor transferring power from the baler drive hydraulic circuit to rotation of the flywheel.

8. A harvesting system for collecting crop grain and crop residue material in a single pass while harvesting a crop from an agricultural field during a harvesting session, the harvesting system comprising:
    a combine harvester for harvesting the crop and having a chassis defining front and rear portions and having ground drive wheels for moving the combine harvester through the agricultural field, combine harvester including,
        a header supported at the front portion of the chassis and cutting the crop from the agricultural field during the harvesting session;
        a feeder section receiving the cut crop material from the header;
        a threshing and cleaning system supported by the chassis and receiving the cut crop from the feeder section and separating the cut crop into the crop grain and the crop residue material;
        a spreader section receiving the crop residue material from the threshing system and defining an outlet opening at the back portion of the chassis for discharging the crop residue material out of the combine harvester, a baler towed behind the combine harvester for baling the residue material and including, and
- a bale chamber for forming bales from the crop residue material;
- a conveyor extending between the spreader section of the combine harvester and the bale chamber for receiving crop residue material from the outlet opening of the spreader section of the combine harvester and moving the crop residue material for receipt into the bale chamber,
- a baling drive system delivering power to the baler for forming the bale in the bale chamber, and a hydraulic system including:
- a combine primary baler drive hydraulic circuit delivering hydraulic power to the baling drive system;
- a spreader hydraulic circuit with spreader drive motors arranged in the combine harvester for rotating spreader disks to discharge the crop residue material out of the combine harvester; and
- a conveyor hydraulic circuit receiving hydraulic power from the spreader hydraulic circuit and arranged to deliver power for driving the conveyor of the baler, the conveyor hydraulic circuit including a conveyor drive motor receiving hydraulic power from the spreader hydraulic circuit for powering the conveyor.

9. The harvesting system of claim 8 wherein the hydraulic system further comprises a baler drive hydraulic circuit transmitting hydraulic power from the combine primary baler drive hydraulic circuit to the baling drive system.

10. The harvesting system of claim 9 wherein the combine primary baler drive hydraulic circuit includes a combine ground drive pump and the baler drive hydraulic circuit includes a baler drive motor operably connected to and receiving hydraulic power from the combine primary baler drive pump for hydraulically powering the baling drive system.

11. The harvesting system of claim 10 wherein the baler is a square baler configured for making square bales from the crop residue material and wherein the baling drive system includes a flywheel rotated by the baler drive motor.

12. The harvesting system of claim 8 wherein the spreader hydraulic circuit includes a valve actuatable to selectively redirect hydraulic power away from the spreader drive motors and toward the conveyor hydraulic circuit.

13. The harvesting system of claim 12 wherein the hydraulic system further comprises a baler auxiliary hydraulic circuit and wherein actuating the valve of the spreader hydraulic circuit selectively redirects hydraulic power away from the spreader drive motors and toward the conveyor hydraulic circuit and the baler auxiliary hydraulic circuit.

14. The harvesting system of claim 13 wherein the baler auxiliary hydraulic circuit includes at least one hydraulic cylinder for actuating at least one of a bale ejector and a ramp actuator of the baler.

15. A harvesting system for collecting a crop grain and a crop residue material in a single pass while harvesting a crop from an agricultural field during a harvesting session, the harvesting system comprising:

a combine harvester for harvesting the crop from the agricultural field and threshing the crop into separated constituents including the crop grain and the crop residue material, wherein the crop grain is temporarily stored in the combine harvester during the harvesting session until a grain unloading event and the crop residue material is discharged out of the combine harvester during the harvesting session;

a baler having a baling chamber and towed behind the combine harvester for baling the residue material into bales in the baling chamber and including a conveyor extending between the combine harvester and the baler to move the crop residue material discharged out of the combine harvester to the baling chamber for forming of the bales therein; and a hydraulic system including,
- a combine hydraulic system providing hydraulic power to the combine;
- a baler hydraulic system providing hydraulic power to the baler;
- a first combine-to-baler hydraulic interconnection delivering hydraulic power from the combine hydraulic system to the baler hydraulic system for powering a first hydraulic circuit of the baler hydraulic system; and
- a second combine-to-baler hydraulic interconnection delivering hydraulic power from the combine hydraulic system to the baler hydraulic system for powering a second hydraulic circuit of the baler hydraulic system, the second hydraulic circuit of the baler hydraulic system being defined by at least one of a conveyor hydraulic circuit for powering the conveyor of the baler and a baler auxiliary hydraulic circuit for powering at least one hydraulic cylinder for actuating at least one of a bale ejector and a ramp actuator of the baler.

16. The harvesting system of claim 15 wherein the combine hydraulic system further comprises,
- a combine ground drive hydraulic circuit delivering power for moving the combine harvester; and
- a spreader hydraulic circuit with spreader drive motors arranged in the combine harvester for rotating spreader disks to discharge the crop residue material out of the combine harvester;

wherein the first hydraulic circuit of the baler hydraulic system is defined by a baler drive hydraulic circuit for delivering power to the baler to form the bales in the bale chamber of the baler;

and wherein the first combine-to-baler hydraulic interconnection hydraulically connects the combine primary baler drive hydraulic circuit of the combine hydraulic system to the baler drive hydraulic circuit of the baler hydraulic system and the second combine-to-baler hydraulic interconnection hydraulically connects the spreader hydraulic circuit of the combine hydraulic system to the at least one of the conveyor and baler auxiliary hydraulic circuits of the baler hydraulic system.

* * * * *